June 12, 1951        W. W. WARD        2,556,784
PHOTOGRAPHIC APPARATUS
Filed March 25, 1950        2 Sheets—Sheet 1
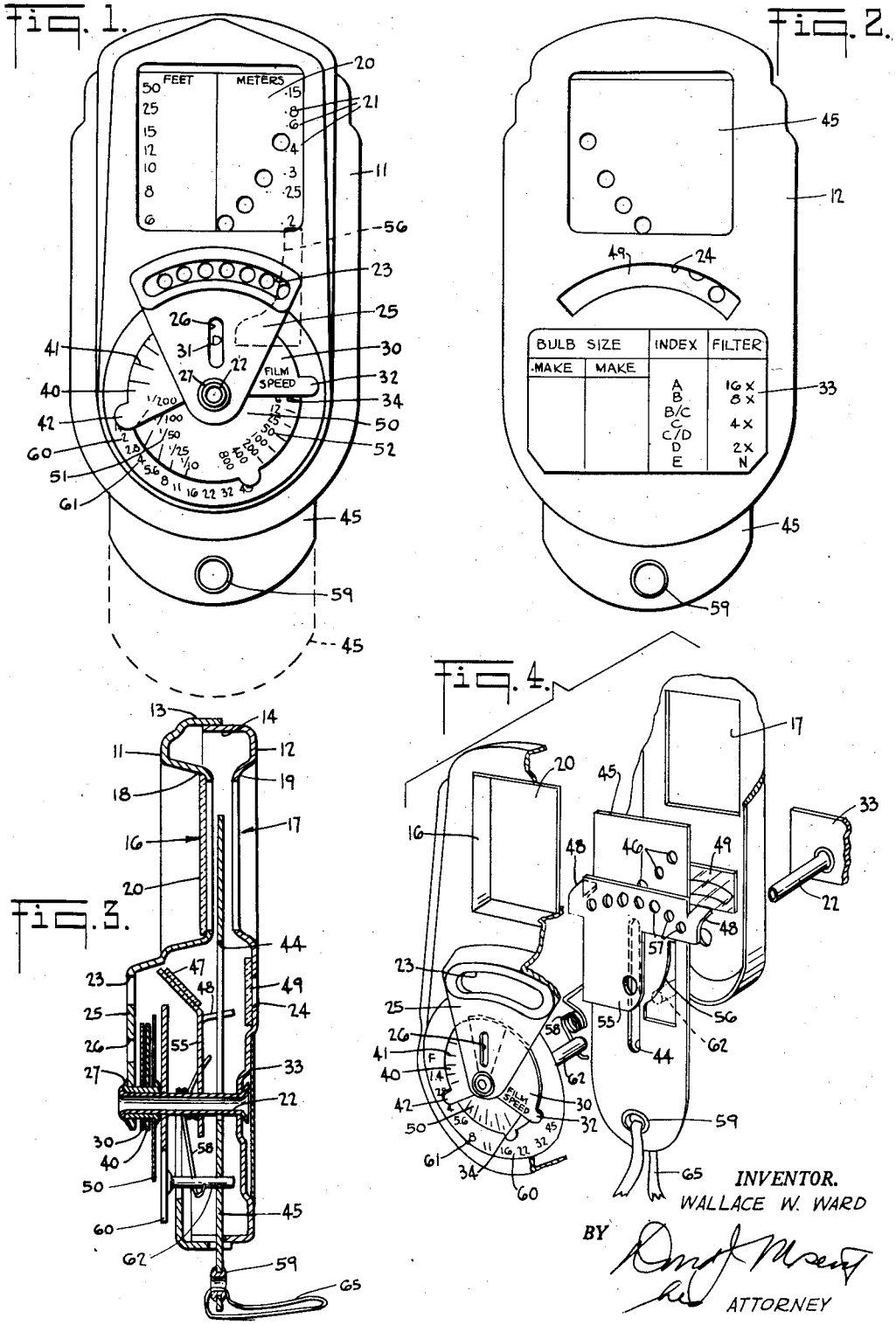
INVENTOR.
WALLACE W. WARD
BY
ATTORNEY

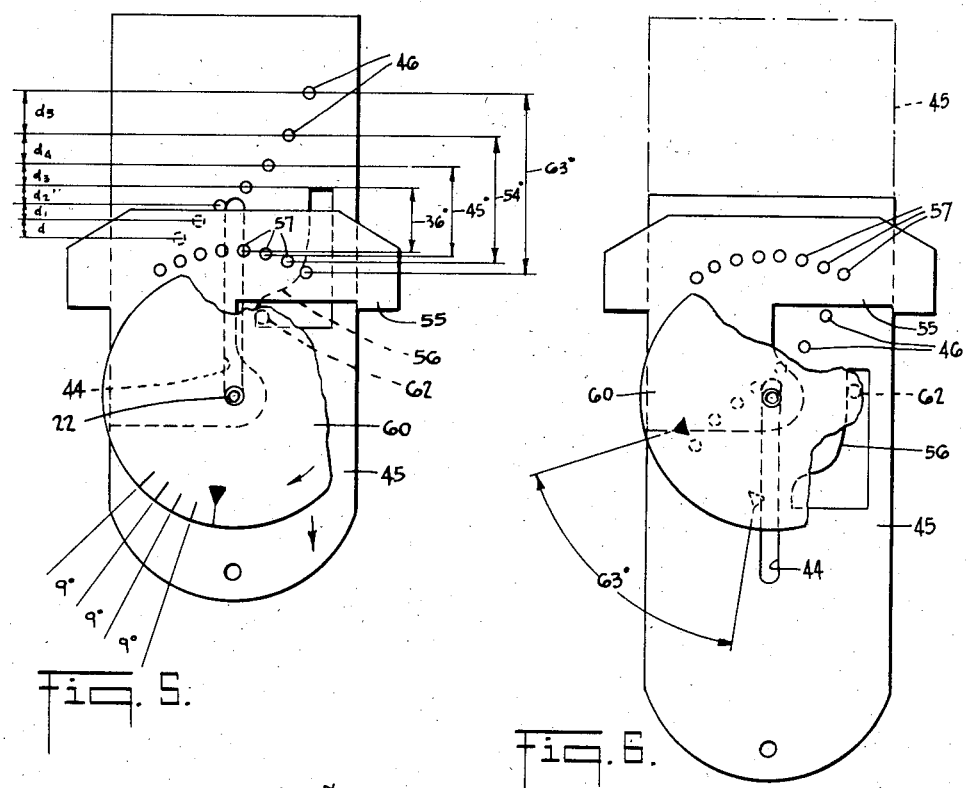
Fig. 5.
Fig. 6.
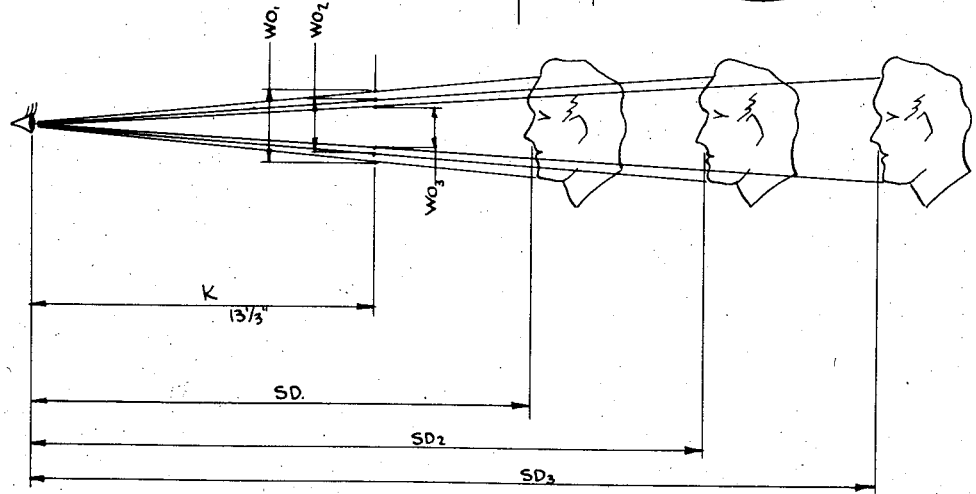
Fig. 7.
INVENTOR.
WALLACE W. WARD
BY
ATTORNEY Patented June 12, 1951

2,556,784

UNITED STATES PATENT OFFICE 2,556,784

PHOTOGRAPHIC APPARATUS

Wallace W. Ward, Bloomfield, N. J., assignor to Products Engineering Laboratories Co., Inc., Newark, N. J., a corporation of New Jersey Application March 25, 1950, Serial No. 151,951

4 Claims. (Cl. 88—23)

This invention relates to photography apparatus and, more particularly, to a novel combined range finder or distance meter, photometer or exposure meter, and flash calculator.

At present, measurement of distance, measurement of light values, and calculations of flash brightness are effected by individual instruments. Distance measurements, for example, are effected by range finders or distance meters of the military, split field, or coincidence types. Light values are separately measured by an exposure meter which may, for example, be of the electric type or of the light extinction type. Flash calculators are usually of the straight or circular slide rule variety. A photographer interested in obtaining the best results thus has to carry and independently manipulate three different instruments. Nevertheless, accurate subject distance, lighting, and flash measurements are essential if the best pictures are to be obtained.

The present invention is directed to a single instrument, which may be termed the "unit," by means of which all three measurements can be made in a coordinated and properly interrelated manner. To this end, the unit comprises a two-section casing forming a housing, the sections having, at one end, aligned rectangular openings, and one opening carrying a pane of transparent rigid material, the sections being united by an eyelet and having congruent arc shaped openings centered on this eyelet. The front or face section has a segment shaped portion offset from the remainder of the front face of the section. This portion has the arced aperture formed therein and also carries the front end of the eyelet.

The eyelet acts as an axis for a plurality of interacting, indicia carrying dials. The outermost dial, which is preferably colored and sector shaped, carries film speed indicia at predetermined angular spacings, for example 9°, and these indicia are observable through a radial aperture in the offset portion. The second dial is likewise sector shaped and carries light value indicia. The third dial carries two sets of shutter speed indicia, and is circular. These three dials are frictionally biased against the overlying sector portion of the forward casing section.

Also rotatably mounted on the eyelet is a fourth dial, which is circular and carries F-stop indicia. On its rear surface this dial carries a projecting pin which cooperates with a cam surface on a slide plate secured between the casing sections. This slide plate fits within the marginal edges of the casing sections and is held in place for vertical reciprocation by the central eyelet passing through the vertical slot thereof, and an eared guide member carried on said eyelet. A series of uniformly spaced apertures are arranged on an arc in the guide member, said apertures being aligned with the arc apertures in the casing sections. Behind the apertures of the guide member is a photographic step wedge of semi-transparent material, each step being aligned with a guide aperture. The arc aperture in the rear casing section is covered by a light diffusing screen of translucent material.

The fourth dial is rotated by the slide reciprocable, as aforesaid, along the casing into and out of registration with the rectangular apertures. This slide has a plurality of apertures arranged on a diagonal line and each longitudinally aligned with those of the guide member. The slide acts as a range finder, in a manner to be described, and its apertures cooperate with the guide member apertures to measure light values. A spring biases the fourth dial in one direction, and the slide, engaging the pin, acts to rotate the fourth dial as the slide is moved longitudinally. Thus, as successive light values are measured by the photographic wedge apertures, the fourth dial is correspondingly rotated to align F-stop indicia with related indicia on the first three dials.

In its range finding function, the slide is cooperable with distance markings on the pane in the rectangular aperture of the front casing section. To provide the necessary base line correlation with such distance markings, a neck cord of predetermined length is secured to the unit.

With the foregoing in mind, it is an object of the present invention to provide a combined photometer, range finder, and a distance coupled flash calculator unit.

Another object is to provide such a unit including cooperating dials, slide and light measuring means having correlated interrelated movement.

These, and other objects, advantages and novel features of the invention will be apparent from the following description and the accompanying drawings. In the drawings:

Fig. 1 is a front elevation view of the unit;

Fig. 2 is a rear elevation view of the unit;

Fig. 3 is a median sectional view of the unit;

Fig. 4 is an exploded isometric view of the unit;

Figs. 5 and 6 are elevation views of the F-stop dial, guide member and slide, showing two different relative positions thereof; and Fig. 7 is a diagrammatic illustration of the geometrical relations upon which the range finder is based.

Referring to Figs. 1 through 4, the combination unit includes a casing comprising front casing section 11 and rear casing section 12 having marginal edges or flanges 13 and 14. The casing sections are formed with aligned, congruent rectangular apertures or windows 16 and 17, which are bounded by inturned flanges 18 and 19. Aperture 16 is closed by a pane 20 of translucent material having distance indicia 21 thereon, for example "feet" and "meters."

The two casing sections are joined by an elongated eyelet 22, which is the center of a pair of aligned, congruent, arc apertures 23 and 24 in the two sections, each extending approximately 72°. Aperture 23 is formed in an offset, sector shaped portion 25 which has a radial slot 26. The latter is cooperable with film speed indicia 31, such as "A," "B," "C" and "D" on a sector shaped dial 30. Indicia 31 are spaced approximately 9° apart and at progressively decreasing distance from eyelet 22. Dial 30 is preferably colored, and has an operating tab 32.

These indicia are used in cooperation with a table 33 on the surface of section 14, which table relates flash bulb sizes and filter numbers to indicia 31. For example, a "16x" filter is related to index "A." The manner of using these indicia will be described more fully hereinafter.

A second sector shaped dial 40 underlies dial 30, and carries light value indicia 41 such as "dull," "hazy," "average," "bright," "brilliant," and "flash." The first four indicia, for example, are spaced approximately 9° apart, whereas "flash" is spaced approximately 18° from "brilliant." Dial 40, whose use will likewise be explained hereinafter, has an operating tab 42.

A shutter speed dial 50, which is circular, underlies dial 40. This dial carries a first set of indicia 51 spaced approximately 9° apart and ranging from "1/800" to "½" followed by "1," "2," "4," "8," and "15." A second set of indicia 52 follows and overlaps the first set, this second comprising "800," "400," "200," "100," "50," "20," "12," "6," "3," "1.6" and ".8." The first five indicia 52 overlap and are radially aligned with the last five indicia 51. The function and operation of dial 50 will be described hereinafter.

The three dials 30, 40 and 50 are secured, in frictional contact with each other, to section 11 by an eyelet 27 surrounding eyelet 22.

A fourth dial 60 having F-stop indicia 61 spaced approximately 9° apart underlies dial 50 and is rotatable on eyelet 22. These indicia range from "1.4" through "45." A drive pin 62 is secured eccentrically to the back surface of dial 60 and engages a cam surface 56 formed on the slide 45. The latter has a vertical slot 44 through which eyelet 22 passes and a series of apertures 46 arranged along a diagonal line. A guide plate 55, the edges of which engage the sidewalls of the casing and through the base of which eyelet 22 passes for fixedly maintaining the same in relation to the casing, is provided with bent ears 48 which serve as bearing surfaces for the sides of the slide 45, which may be vertically reciprocated within the casing in the amount defined by the length of the slot 44. Guide plate 55 has a plurality of apertures 57 equal in number to the apertures 46 of slide 45, said apertures being arranged in an arc centered on eyelet 22 and each aperture being laterally aligned with an aperture 46 of the slide 45. A stepped photographic wedge 47 of semi-transparent material is secured to the back of the guide plate 55 with each step underlying an aperture 57 thereof.

A spring 58 fits over eyelet 22 and has one end anchored against guide member 55 and the other end anchored against pin 62. This pin biases dial 60 in a counter-clockwise direction, and dial 60 is moved in a clockwise direction by slide 45. As will be explained, this coordinates the reading of dial 60 with the light values measured by step wedge 47. A diffusing screen 49, of flat translucent material, is mounted over arc aperture 24 behind apertures 46. An adjustable neck cord 65 is fixed to the lower end of slide 45, as by being tied to an eyelet 59.

It will be noted that the indicia on dials 30, 40, 50 and 60 are equally angular spaced. In the case of the indicia of dial 50, each index 51 or 52 is progressively ½ or twice the value of an adjacent index, as is also true of the indicia 61 of dial 60. Similarly, the indicia 41 of dial 40 indicate qualitatively light values progressively ½ or twice that of adjacent indicia. The same is true of the indicia 31 of dial 30, which denote flash bulbs each having twice the light value of the next smaller size bulb, or filters having the same progressive relation as to value. Having these in mind, the operation of the unit will be apparent from the following description.

In using the unit as a range finder or distance meter, the slide 45 is used in cooperation with pane 20. For this purpose, neck cord 65 is adjusted to provide, when taut, a fixed distance, such as 13⅓" from the eye to pane 20. The head or face height of a subject is assumed to be, for example, 7¾", within the limits of practical accuracy desired. Referring to Fig. 7, the distance may then be determined by the principle of similar triangles. If the line of sight passes through pane 20, one limit line will be the upper edge of aperture 16. In sighting on a person, for example, slide 45 is moved down until the line of sight over the top edge of the slide hits the chin of the subject when the line of sight under the upper edge of aperture 16 hits the top of the subject's head. The indicia 21 in line with the upper edge of slide 45 then gives the distance in feet or meters.

The angle formed between the limit sight lines varies with the distance of the subject. Knowing the base of the observed triangle to be 7¾" and the altitude of the triangle based on pane 20 to be 13⅓", the indicia 21 can be calibrated to indicate the altitudes of other similar or proportional triangles having different vertex angles. These "altitudes" are the distance of the subject from the eye. With a little practice, the distance of other objects can also be determined.

In using the unit as an exposure meter, dial 30 is rotated until the proper filter index 31 appears in slot 26. The index edge 34 of dial 30 then has a certain angular position. Dial 50 is then rotated until a selected film speed indicia 51 is registered against edge 34. The indicia 52 are then in a certain angular relation to dial 60. The index edge 42 of light value dial 40 is then set against the desired shutter speed indicia 52 of dial 50.

Slide 55 is then moved downwardly, successively registering apertures 57 with successive apertures 46. This is continued, with lighted dots appearing in successive apertures 46, until the light no longer penetrates. Slide 55 is then moved upwardly until the lighted dot reappears. During this slide movement, dial 60 is rotated by the cam and spring action on pin 62. The proper F-stop value may then be read from dial 60 opposite the indicia 41 most closely descriptive of the general lighting conditions.

To use the unit as a flash calculator, the proper letter designation for the flash bulb is taken from table 33 and set in slot 26 by moving dial 30. The film speed dial 50 is then set, as described, and dial 40 moved until its index edge 42 registers at the desired film speed indicia 52. The range finding procedure is then followed, moving slide 55 and thus dial 60. The proper F-stop can then be taken from dial 60 at the flash indication of dial 40.

While a specific embodiment of the invention has been shown and described in detail to illustrate the application of the principles thereto, it should be understood that the invention may be otherwise embodied without departing from such principles.

What is claimed is:

1. Photographic apparatus comprising, in combination, a casing having spaced aligned openings therein, a step wedge aligned with the openings, a slide movably mounted in said casing and having apertures each alignable with an opening at a predetermined position of said slide, a dial movably mounted on said casing and carrying F-stop indicia, index means associated with said dial, means interconnecting said slide and said dial to move the latter during movement of said slide, whereby the proper F-stop may be determined from the relative positions of said dial and index means, a sighting aperture arranged to be controlled by said slide, and having an edge, distance indicia associated with the sighting aperture and arranged along the direction of movement of said slide, and means operable to position said apparatus at a fixed distance from the user's eye, whereby said distance indicia, in cooperation with the end of said slide, will indicate the distance of a subject of known dimensions viewed between said edge and the slide end.

2. Photographic apparatus comprising, in combination, a casing having spaced aligned openings therein, a step wedge aligned with the openings, a slide movably mounted in said casing and having apertures each alignable with an opening at a predetermined position of said slide, a first sector shaped dial rotatably mounted on said casing and carrying film speed indicia and having an index edge, a second sector shaped dial rotatably mounted on said casing and carrying brightness indicia, a first circular dial rotatably mounted on said casing and carrying shutter speed indicia cooperable with said index edge, said second sector shaped dial having an index section alignable with a selected shutter speed index, a second circular dial rotatably mounted on said casing and carrying F-stop indicia cooperable with said brightness indicia, all of said dials being concentric, means interconnecting said slide and said second dial to move the latter during movement of said slide, whereby the proper F-stop may be determined from the relative positions of said second dials, a sighting aperture arranged to be controlled by said slide, and having an edge, distance indicia associated with the sighting aperture and arranged along the direction of movement of said slide, and means operable to position said apparatus at a fixed distance from the user's eye, whereby said distance indicia, in cooperation with the end of said slide, will indicate the distance of a subject of known dimensions viewed between said edge and the slide end.

3. Photographic apparatus as claimed in claim 2, in which the indicia of any dial have a 2:1 ratio of indicia value between successive indicia.

4. Photographic apparatus as claimed in claim 2, in which the indicia of any dial have a 2:1 ratio of indicia value between successive indicia and are arranged at equal angular distances from each other.

WALLACE W. WARD.

REFERENCES CITED

The following references are of record in the file of this patent:

UNITED STATES PATENTS

| Number | Name | Date |
| --- | --- | --- |
| 2,001,840 | Gauthier et al. | May 21, 1935 |
| 2,205,312 | Schwartzmann | June 18, 1940 |

FOREIGN PATENTS

| Number | Country | Date |
| --- | --- | --- |
| 405,881 | Great Britain | Feb. 15, 1934 |